(12) United States Patent
Xiu et al.

(10) Patent No.: US 12,244,791 B2
(45) Date of Patent: Mar. 4, 2025

(54) HISTORY-BASED MOTION VECTOR PREDICTION

(71) Applicant: VID SCALE, INC., Wilmington, DE (US)

(72) Inventors: Xiaoyu Xiu, San Diego, CA (US); Yuwen He, San Diego, CA (US); Jiancong Luo, Skillman, NJ (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/510,196

(22) Filed: Nov. 15, 2023

(65) Prior Publication Data
US 2024/0089427 A1 Mar. 14, 2024

Related U.S. Application Data

(63) Continuation of application No. 17/419,361, filed as application No. PCT/US2019/067639 on Dec. 19, 2019, now abandoned.
(Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/51* (2014.11)

(58) Field of Classification Search
CPC .. H04N 19/159; H04N 19/176; H04N 19/577; H04N 19/573
See application file for complete search history.

(56) References Cited

U.S. PATENT DOCUMENTS 9,503,720 B2 11/2016 Chen et al.
2011/0194609 A1 8/2011 Rusert et al.
(Continued)

FOREIGN PATENT DOCUMENTS

CN 104662909 A 5/2015
CN 107211156 A 9/2017
(Continued)

OTHER PUBLICATIONS

Chen, Jianle; Ye, Yan; Hwan Kim, Sueng; "Test Model 3 of Versatile Video Coding (VTM 3)", JVET-L1002-v1, Joint Video Experts Team (JVET) of ITU-T SG 16 WP 3 and ISO/IEC JTC 1/SC 29/WG 11, Oct. 12, 2018 (Year: 2018).*
(Continued)

*Primary Examiner* — Jeremiah C Hallenbeck-Huber
(74) *Attorney, Agent, or Firm* — Condo Roccia Koptiw LLP

(57) ABSTRACT

Systems, methods, and instrumentalities are disclosed for processing history-based motion vector prediction (HMVP). A video coding device may generate a history-based motion vector prediction (HMVP) list for a current block. The video coding device derive an HMVP candidate from a previously coded block. The HMVP candidate may include motion information associated with a neighboring block of the current block, one or more reference indices, and a bi-prediction weight index. The video coding device may add the HMVP candidate to the HMVP list for motion compensated prediction of a motion vector associated with the current block. The video coding device use one HMVP selected from the HMVP list to perform motion compensated prediction of the current block. The motion compensated prediction may be performed using the motion information associated with the neighboring block of the current
(Continued)

block, the one or more reference indices, and the bi-prediction weight index.

27 Claims, 14 Drawing Sheets

Related U.S. Application Data

(60) Provisional application No. 62/786,429, filed on Dec. 29, 2018.

(51) Int. Cl.
  *H04N 19/176* (2014.01)
  *H04N 19/51* (2014.01)

(56) References Cited

U.S. PATENT DOCUMENTS

| | | | |
|---|---|---|---|
| 2011/0200107 A1* | 8/2011 | Ryu | H04N 19/162 375/E7.125 |
| 2014/0044180 A1* | 2/2014 | Chen | H04N 19/51 375/240.16 |
| 2014/0071235 A1 | 3/2014 | Zhang et al. | |
| 2014/0161186 A1 | 6/2014 | Zhang et al. | |
| 2016/0219278 A1 | 7/2016 | Chen et al. | |
| 2020/0186818 A1* | 6/2020 | Li | H04N 19/423 |
| 2020/0204807 A1* | 6/2020 | Ye | H04N 19/577 |
| 2021/0243470 A1* | 8/2021 | Solovyev | H04N 19/573 |
| 2022/0060687 A1* | 2/2022 | Jang | H04N 19/573 |

FOREIGN PATENT DOCUMENTS

| | | | | |
|---|---|---|---|---|
| GB | 2580326 A | * | 7/2020 | H04N 19/103 |
| JP | 2021-533696 A | | 12/2021 | |
| JP | 2022-505771 A | | 1/2022 | |
| JP | 2022-506717 A | | 1/2022 | |
| RU | 2574831 C2 | | 2/2016 | |
| RU | 2624560 C2 | | 7/2017 | |
| WO | 2013/077659 A1 | | 5/2013 | |
| WO | 2020/030187 A1 | | 2/2020 | |
| WO | 2020/085954 A1 | | 4/2020 | |
| WO | 2020/123218 A1 | | 6/2020 | |
| WO | WO-2020126262 A1 | * | 6/2020 | H04N 19/105 |

OTHER PUBLICATIONS

"VTM-3.0 Reference Software", Available at <https://vcgit.hhi.fraunhofer.de/jvet/VVCSoftware_VTM/tags/VTM-3.0>, pp. 1-2.
Alshina et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.
Bross et al., "High Efficiency Video Coding (HEVC) Text Specification Draft 10 (for FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Bross et al., "Versatile Video Coding (Draft 3)", JVET-L1001-V7, Editors, Joint Video Experts Team (JVET) of ITU-T SG 16 WP 3 and ISO/IEC JTC 1/SC 29/WG 11, 12th Meeting: Macao, CN, Oct. 3-12, 2018, 223 pages.
Bross et al., "Versatile Video Coding (Draft 3)", JVET-L1001-v9, Editors, JVET of ITU-T SG 16 WP 3 and ISO/IEC JTC 1/SC 29/WG 11, 12th Meeting: Macao, CN, Oct. 3-12, 2018, 233 pages.
Chen et al., "Coding Tools Investigation for Next Generation Video Coding", Qualcomm Incorporated, COM 16-C 806-E, International Telecommunication Union, Telecommunication Standardization Sector, Jan. 2015, pp. 1-7.
Chen et al., "Generalized Bi-Prediction Method for Future Video Coding", IEEE 2016 Picture Coding Symposium (PCS), Dec. 2016, 5 pages.
ITU-T, "Advanced Video Coding for Generic Audiovisual Services", ITU-T Recommendation H.264, Series H: Audiovisual and Multimedia Systems, Infrastructure of Audiovisual Services—Coding of Moving Video, Nov. 2007, 563 pages.
Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.
Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.
Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.
SMPTE, "VC-1 Compressed Video Bitstream Format and Decoding Process", SMPTE 421M, Apr. 2006, 493 pages.
Su et al., "CE4-related Generalized Bi-Prediction Improvements Combined from JVET-L0197 and JVET-L0296", JVET-L0646-v5, MediaTek Inc., InterDigital Communications, Inc., Joint Video Experts Team (JVET) of ITU-T SG 16 WP 3 and ISO/IEC JTC 1/SC 29/WG 11, 12th Meeting, Macao, China, Oct. 3-12, 2018, pp. 1-6.
Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.
Zhang et al., "CE4: History-based Motion Vector Prediction (Test 4.4.7)", JVET-L0266-v1, Bytedance Inc., Joint Video Experts Team (JVET) of ITU-T SG 16 WP 3 and ISO/IEC JTC 1/SC 29/WG 11, 12th Meeting: Macao, CN, Oct. 3-12, 2018, pp. 1-4.
Zhang et al., "CE4-Related: History-Based Motion Vector Prediction", JVET-K0104-V5, Bytedance Inc., Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-7.
Zhang et al., "Non-CE4: Harmonization between HMVP and GBi", JVET-M0264, Peking University, Bytedance Inc. and InterDigital Communications, Inc., Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-2.
Park et al., "CE4-related: History-Based Motion Vector Prediction Considering Parallel Processing", JVET-L0158, LG Electronics Inc., Joint Video Experts Team (JVET) of ITU-T SG 16 WP 3 and ISO/IEC JTC 1/SC 29/WG 11, 12th Meeting: Macau, CN, Oct. 8-12, 2018, 6 pages.

* cited by examiner

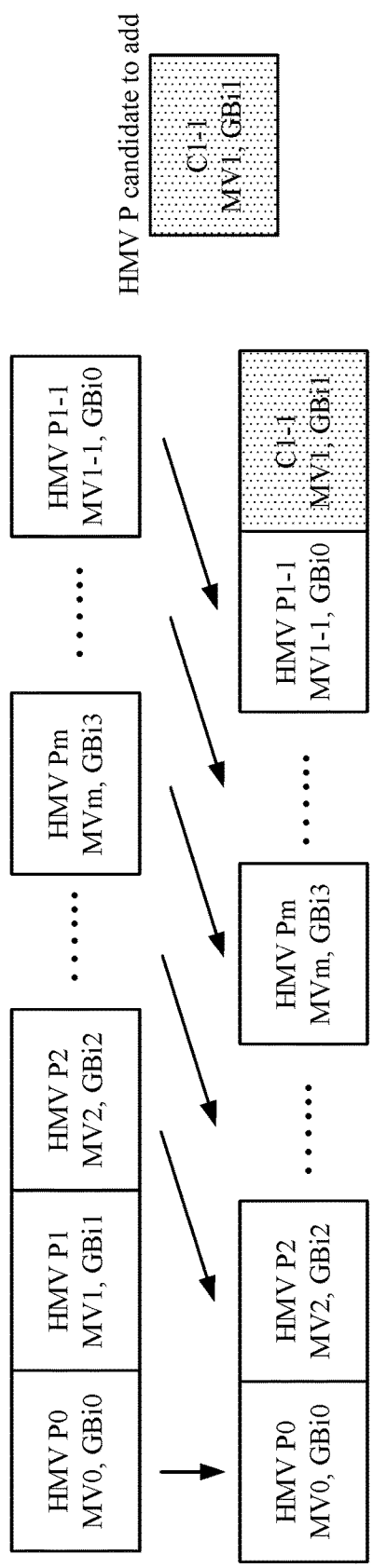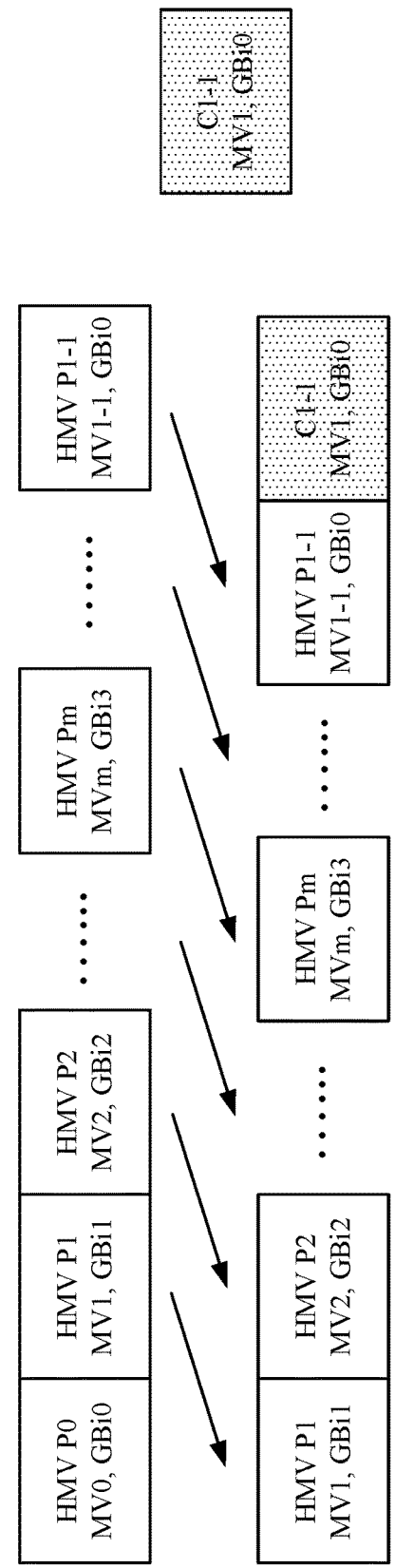
FIG. 8A
FIG. 8B

HISTORY-BASED MOTION VECTOR PREDICTION

CROSS REFERENCE TO RELATED APPLICATIONS

This application is a Continuation Application of U.S. Non-Provisional application Ser. No. 17/419,361, filed Jun. 29, 2021, which is the National Stage Entry under 35 U.S.C. § 371 of Patent Cooperation Treaty Application No. PCT/US2019/067639, filed Dec. 19, 2019, which claims the benefit of U.S. Provisional Patent Application No. 62/786,429 filed on Dec. 29, 2018, the contents of which are hereby incorporated by reference herein.

BACKGROUND

Video coding systems are widely used to compress digital video signals to reduce the storage needs and/or transmission bandwidth of such signals. Among the various types of video coding systems, such as block-based, wavelet-based, and object-based systems, block-based hybrid video coding systems are widely used and deployed. Various video coding techniques including, for example, history-based motion vector prediction may be utilized to perform video coding. Potential interaction of the video coding techniques with other coding tools in a video coding standard may not be utilized. This may result in significant drop in the coding performance of the video coding techniques.

SUMMARY

Systems, methods, and instrumentalities are disclosed for processing history-based motion vector prediction (HMVP). A video coding device may generate an HMVP list for a current block. The video coding device may derive an HMVP candidate from a previously coded block. The HMVP candidate may include motion information associated with a previously coded block (e.g., a neighboring block of the current block), one or more reference indices, and a bi-prediction weight index. The motion information may include at least one or more motion vectors. The bi-prediction weight index may include one or more weight indices associated with the neighboring block. One or more weights may be applied to a prediction signal that is generated by performing motion compensated prediction of the current block.

The video coding device may add the HMVP candidate to the HMVP list for motion compensated prediction of a motion vector associated with the current block. The video coding device may use an HMVP selected from the HMVP list to perform motion compensated prediction of the current block. The motion compensated prediction may be performed using the motion information associated with the neighboring block of the current block, the one or more reference indices, and the bi-prediction weight index.

The video coding device may perform pruning by determining whether the HMVP candidate is identical to an HMVP in the HMVP list for the current block. If the HMVP candidate is identical to any of the HMVPs in the HMVP list, the video coding device may remove the HMVP from the HMVP list. The video coding device may add the HMVP candidate to the end of the HMVP list. The video coding device may move one or more HMVPs after the removed HMVP in the HMVP list forward by one position. In an example, the HMVP candidate may be said to be identical to an HMVP in the HMVP list, if the HMVP candidate and the HMVP in the HMVP list have same motion vectors and same reference indices. In an example, the HMVP candidate may be said to be identical to an HMVP in the HMVP list, if the HMVP candidate and the HMVP in the HMVP list have same motion vectors, same reference indices, and same generalized bi-prediction (GBi) or bi-prediction with CU-level weights (BCW) weights.

If the HMVP candidate is not identical to any of the HMVPs in the HMVP list, the video coding device may remove the oldest HMVP entry of the HMVP list, for example, if the HMVP list is full. The video coding device may add the HMVP candidate to the end of the HMVP list. The video coding device may reset an HMVP list when coding of a new coding tree unit (CTU) line is started.

BRIEF DESCRIPTION OF THE DRAWINGS

FIG. 8A illustrates an example of adding a HMVP candidate to a HMVP list while considering the GBi weight.

FIG. 8B illustrates an example of adding a HMVP candidate to a HMVP list using the first-in first-out (FIFO) scheme.

DETAILED DESCRIPTION

A detailed description of illustrative embodiments will now be described with reference to the various Figures.

Although this description provides a detailed example of possible implementations, it should be noted that the details are intended to be exemplary and in no way limit the scope of the application.

One or more video coding devices in a video coding system may compress digital video signals, for example, to reduce the storage space and/or transmission bandwidth associated with the storage and/or delivery of such signals. A video coding device may be based on a block-based hybrid video coding framework. A multi-type tree based block partitioning structure may be employed. One or more of coding modules, for example, an intra prediction module, an inter prediction module, a transform/inverse transform module and a quantization/de-quantization module may be included. The video coding device may include in-loop filters.

The video coding device may include one or more coding tools that may provide higher coding efficiency and moderate implementation complexity. The coding tools may include one or more of the following: affine motion model, alternative temporal motion vector prediction (ATMVP), integer motion vector (IMV), generalized bi-prediction (GBi) orbi-prediction with CU-level weights (BCW), bi-directional optical flow (BDOF), combined inter merge/intra prediction, merge with motion vector difference (MMVD), pairwise average merge candidate, triangular inter prediction for inter coding; cross-component linear model (CCLM), multi-line intra prediction, current picture referencing (CPR) for intra prediction; enhanced multiple transform (EMT), dependent quantization for quantization and transform coding, and adaptive loop filtering (ALF) for in-loop filters.

Figure 1:
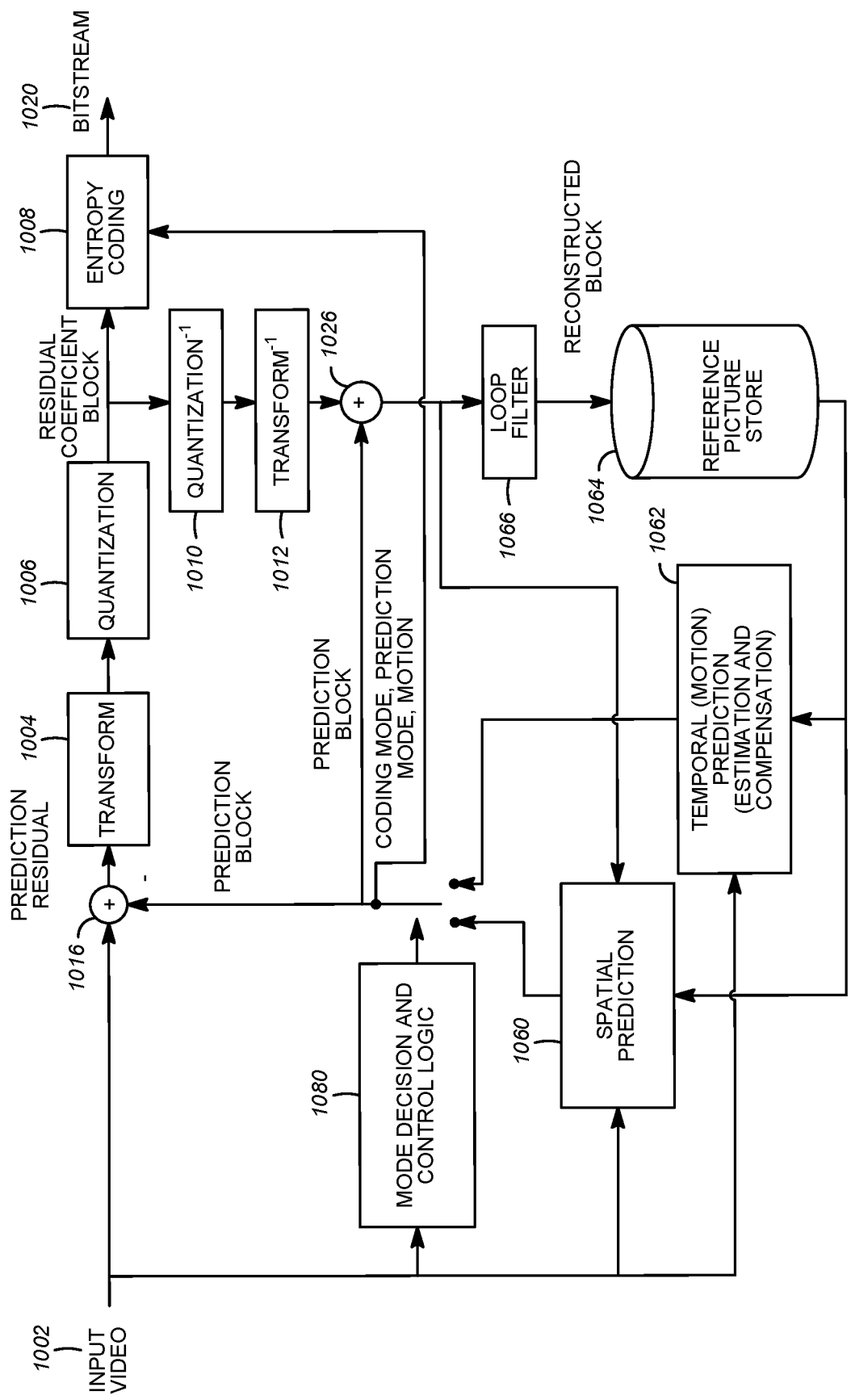
FIG. 1 illustrates an exemplary diagram of a block-based video encoder.
Figure 2:
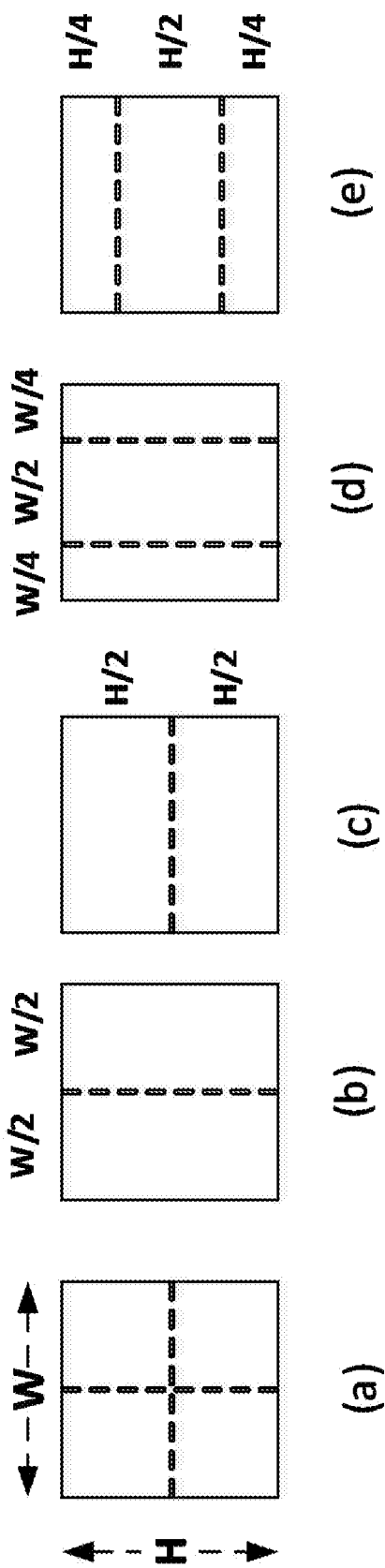
FIG. 2 illustrates example block partitions in a multi-type tree structure.

An example block-based video coding system may include a block-based hybrid video coding framework. FIG. 1 illustrates an exemplary block diagram of a block-based hybrid video encoding system. As illustrated in FIG. 1, the input video signal 1002 may be processed block by block. Extended block sizes (e.g., referred to as a coding unit or CU) may be used to compress high resolution (e.g., 1080p and/or beyond) video signals. A CU may include sizes of up to 128×128 pixels. Blocks may be partitioned based on quad-trees. A coding tree unit (CTU) may be split into CUs to adapt to varying local characteristics based on quad/binary/ternary-tree. A CU may or may not be partitioned into prediction units or PUs, for which separate predictions may be applied. A CU may be used (e.g., may always use) as the basic unit for prediction and transform without further partitions. In a multi-type tree structure, a (e.g., one) CTU may be partitioned (e.g., may be firstly partitioned) by a quad-tree structure. A quad-tree leaf node (e.g., each quad tree lead node) may be further partitioned by a binary and ternary tree structure. As illustrated in FIG. 2, there may be one or more (e.g., five) splitting types including, for example, quaternary partitioning, horizontal binary partitioning, vertical binary partitioning, horizontal ternary partitioning, and vertical ternary partitioning.

Referring to FIG. 1, an input video block (e.g., macroblock (MB) and/or a CU), spatial prediction 1060 and/or temporal prediction 1062 may be performed. Spatial prediction 1060 (e.g., intra prediction) may use pixels from samples of coded neighboring blocks (e.g., reference samples) in the video picture/slice to predict the current video block. The spatial prediction 1060 may reduce spatial redundancy, for example, that may be inherent in the video signal. Motion prediction 1062 (e.g., inter prediction and/or temporal prediction) may use reconstructed pixels from the coded video pictures, for example, to predict the current video block. The motion prediction 1062 may reduce temporal redundancy, for example, that may be inherent in the video signal. Motion prediction signals (e.g., a temporal prediction signal) for a video block (e.g., a CU) may be signaled by one or more motion vectors (MVs). The MVs may indicate the amount and/or the direction of motion between the current block and/or the current block's reference block or its temporal reference. If multiple reference pictures are supported for a (e.g., each) video block, the video block's reference picture index may be sent by an encoder. The reference picture index may be used to identify from which reference picture in a reference picture store 1064 the motion prediction signal may derive.

After the spatial prediction 1060 and/or motion prediction 1062, a mode decision block 1080 in the encoder may determine a prediction mode (e.g., the best prediction mode), for example, based on a rate-distortion optimization. The prediction block may be subtracted from a current video block at 1016, and/or the prediction residual may be de-correlated using a transform 1004 and/or a quantization 1006 to achieve a bit-rate, such as a target bit rate. The quantized residual coefficients may be inverse quantized at the inverse quantization 1010 and/or inverse transformed at transform 1012, for example, to form the reconstructed residual, which may be added to the prediction block at 1026, for example, to form a reconstructed video block. In-loop filtering (e.g., a de-blocking filter and/or adaptive loop filters) may be applied at loop filter 1066 on the reconstructed video block before the reconstructed video block may be put in the reference picture store 1064 and/or used to code video blocks (e.g., future video blocks). To form the output video bit-stream 1020, coding mode (e.g., inter or intra), prediction mode information, motion information, and/or quantized residual coefficients may be sent (e.g., may all be sent) to an entropy coding module 1008, for example, to be compressed and/or packed to form the bit-stream.

Figure 3:
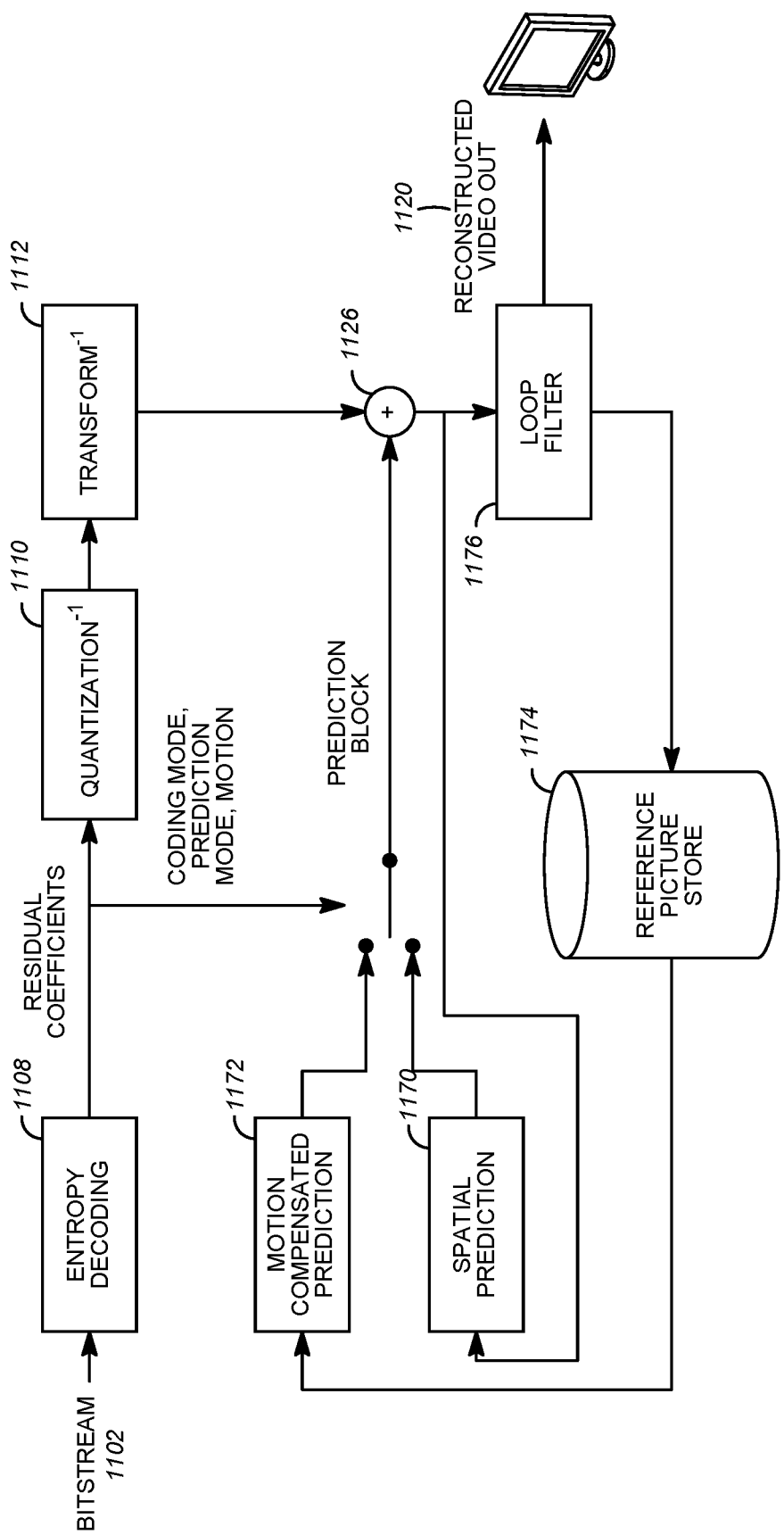
FIG. 3 illustrates an exemplary diagram of a block-based video decoder.

FIG. 3 illustrates a block diagram of an example block-based video decoding framework for a decoder. A video bit-stream 1102 (e.g., the video bit-stream 1020 in FIG. 1) may be unpacked (e.g., first unpacked) and/or entropy decoded at an entropy decoding module 1108. The coding mode and prediction information may be sent to a spatial prediction module 1170 (e.g., if intra coded) and/or to a motion compensation prediction module 1172 (e.g., if inter coded and/or temporal coded) to form a prediction block. Residual transform coefficients may be sent to an inverse quantization module 1110 and/or to an inverse transform module 1112, e.g., to reconstruct the residual block. The prediction block and/or the residual block may be added together at 1126. The reconstructed block may go through in-loop filtering at a loop filter 1176, for example, before the reconstructed block is stored in a reference picture store 1174. The reconstructed video 1120 in the reference picture store 1174 may be sent to drive a display device and/or used to predict video blocks (e.g., future video blocks).

One or more coding modules, for example, the coding modules associated with inter prediction, may be enhanced to improve inter coding efficiency. For example, as described herein, the coding efficiency of history-based motion vector prediction (HMVP) may be improved.

The MVs of inter-coded blocks may be signaled using one or more mechanisms as described herein. For example, the MVs of inter-coded blocks may be signaled using advanced motion vector prediction (AMVP) mode or merge mode. In the AMVP mode, the difference between the real MV and a MV predictor (MVP), a reference index, and a MVP index referring to an AMVP candidate list may be signaled. For the merge mode, a merge index referring to a merge candidate list may be signaled. The motion information associated with a merge candidate may be inherited from the signaled merge candidate. Motion information, for example for the AMVP and merge candidates, may be derived from the spatial blocks that neighbor a CU. For example, the spatial blocks may directly neighbor (e.g., be adjacent to) the current CU or a collocated block in a temporal reference picture. One or more merge candidates (e.g., up to 6 merge candidates) and one or more AMVP candidates (e.g., up to 2 AMVP candidates) may be added to a candidate list for motion vector prediction.

HMVP may be employed to explore the correlation between the MVs of neighboring blocks. For example, HMVP may be utilized to explore correlation between neighboring spatially non-adjacent blocks. Although reference is made herein to the HMVP being utilized by neighboring blocks that are spatially non-adjacent, one skilled in the art may appreciate that the neighboring blocks may also include blocks that are adjacent blocks.

Figure 4:
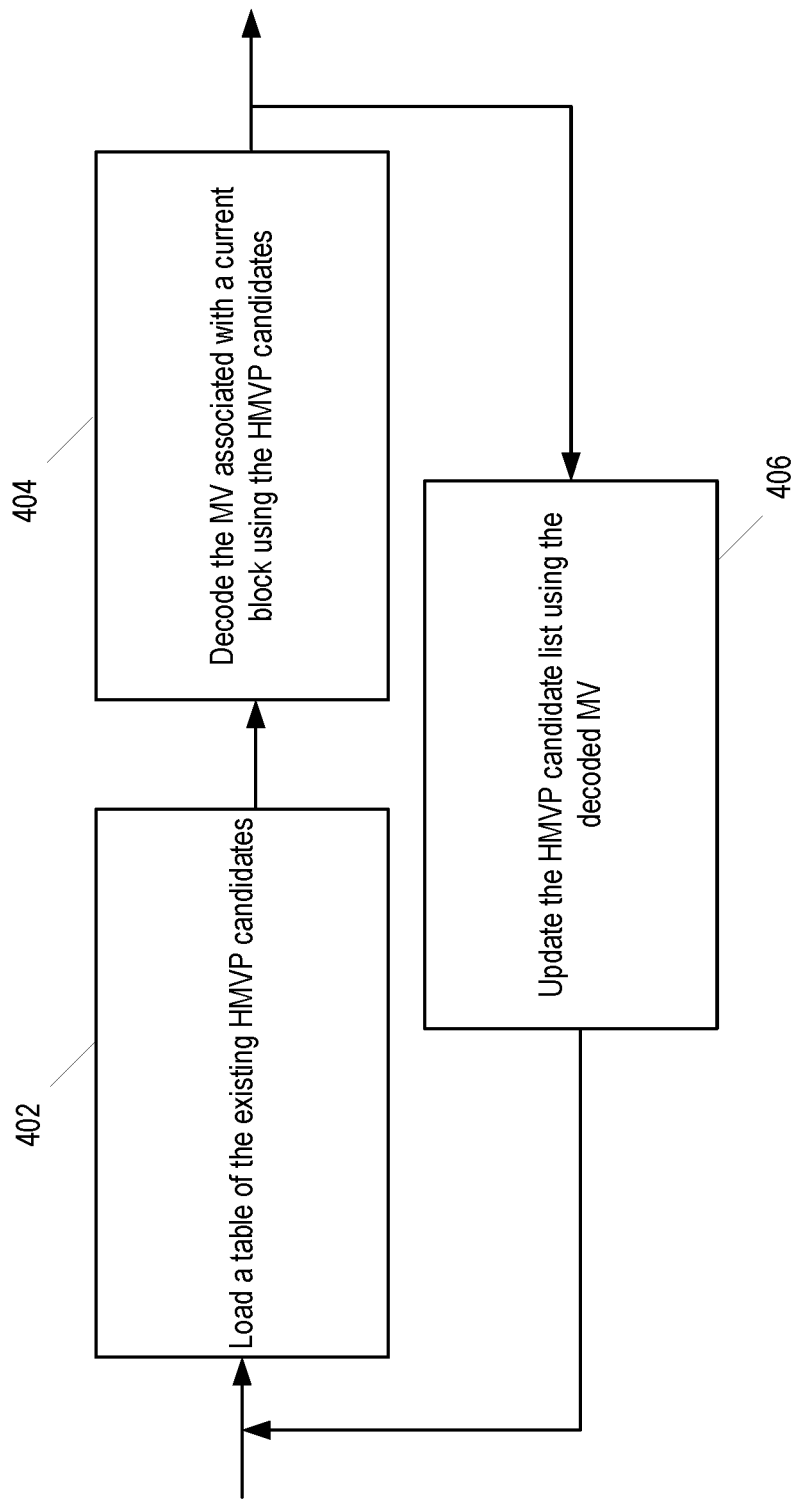
FIG. 4 illustrates exemplary history-based motion vector prediction (HMVP) coding procedure.

A HMVP candidate may indicate the motion information of a previously coded CU. The motion information may include one or more of the MVs and the reference picture index. A table of multiple HMVP candidates may be maintained at an encoder and/or a decoder. The HMVP candidate table may be reset (e.g., reset to empty) when the coding of a new CTU line is started. After an inter CU that does not contain multiple sub-blocks (e.g., the ATMVP and affine coded CUs) is coded, the associated motion information may be added to an entry (e.g., the last entry in the HMVP candidate table) based on a rule (e.g., a constrained first-in-first-out (FIFO) rule). A redundancy check may be applied to identify whether there is an existing HMVP candidate that is identical to a new motion candidate (e.g., before adding the motion candidate into the HMVP candidate table or list). If an existing HMVP candidate that is identical to the new motion candidate is found, the identical HMVP candidate may be removed from the HMVP candidate table or list and the HMVP candidates may be moved forward by one position, for example, by reducing the HMVP candidate table index by one. FIG. 4 illustrates an exemplary decoding workflow when HMVP is applied to predict MVs. As illustrated in FIG. 4, at 402, the existing HMVP candidates may be loaded in a list of existing HMVP candidates. At 404, MV associated with a current block may be decoded from the HMVP candidates. At 406, the HMVP candidate list may be updated based on the decoded MV.

Generalized bi-prediction (GBi) or bi-prediction with CU-level weights (BCW) may be performed. For example, GBi or BCW may be performed to improve the efficiency of bi-prediction when one CU is predicted by two temporal prediction blocks from the reference pictures that are reconstructed. In bi-prediction mode, the prediction signal at sample x may be calculated as the average of two prediction signals, as shown in the equation (1).

$$P[x]=(P_0[x+v_0]+P_1[x+v_1])/2, \qquad (1)$$

Referring to the equation (1): P[x] may be the resulting prediction signal of a sample x located at a picture position x, $P_1[x+v_1]$ may be the motion-compensated prediction signal of x using the motion vector (MV) $v_1$ for i-th list (e.g., list 0, list 1). GBi may apply a variety of weight values (e.g., w0 and w1) to the two prediction signals from list 0 and list 1. One or more configurations of w0 and w1 may imply prediction similarities to uni-prediction and bi-prediction (e.g., the same prediction as conventional uni-prediction and bi-prediction). For example, prediction similarities to uni-prediction and bi-prediction may exist when (w0, w1) equals: (1, 0) for uni-prediction with reference list L0; (0,1) for uni-prediction with reference list L1; and (0.5, 0.5) for the conventional bi-prediction with two reference lists. In GBi, the weights applied to the prediction signals from lists L0 and L1 may be signaled per CU. A constraint may be applied so that the summation of w0 and w1 is 1, e.g., w0+w1=1. The constraint may be applied to reduce signaling overhead. Given such constraint, a single weight may be signaled, and the final bi-prediction signal when the GBi is applied may be calculated, for example, using equation (2).

$$P[x]=(1-w_1)*P_0[x+v_0]+w1*P_1[x+v_1]. \qquad (2)$$

Referring to (2), w1 may be discretized, e.g., using values {−1/4, 1/4, 3/8, 1/2, 5/8, 3/4, 5/4}, so that each weight value can be indicated by an index value within a small limited range. The discretization of w1 using a small range may be utilized to reduce signaling overhead. The weight values {1/4, 3/8, 1/2, 5/8, 3/4} may be applied to an inter picture (e.g., all inter pictures) and the weight values {−1/4, 5/4} may be applied to low-delay pictures. The weight values may be applied to low-delay pictures that can be predicted by using the reference picture preceding the current picture as per the display order.

Figure 5:
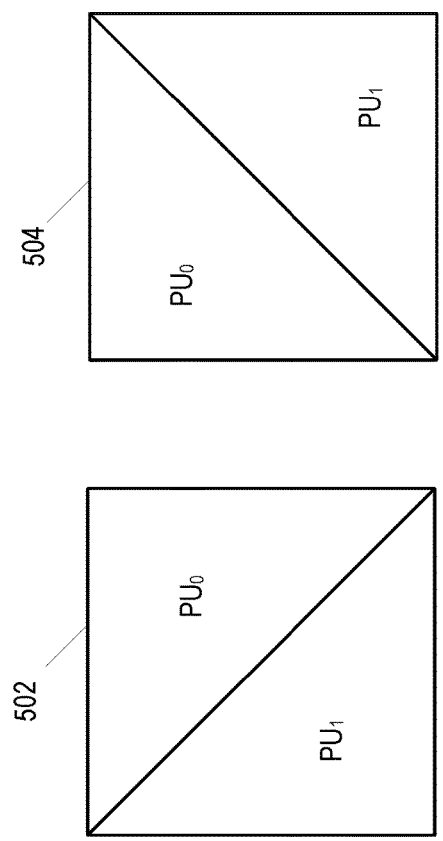
FIG. 5 illustrates example of a diagonal triangle partition based motion compensated prediction, and an example of an inverse-diagonal triangle partition based motion compensated prediction.

Triangle inter prediction may be performed. In some video content (e.g., nature video content), the boundaries between two moving objects may not be horizontal or vertical (e.g., purely horizontal or vertical). Such non-horizontal or non-vertical boundaries may be difficult to be accurately approximated by rectangular blocks. Triangular prediction may, therefore, be applied for example to enable triangular partitions for motion compensated prediction. As illustrated in FIG. 5, triangular prediction may split a CU into one or more (e.g., two) triangular prediction units, e.g., in a diagonal direction (502) or an inverse-diagonal direction (504). A triangular prediction unit (e.g., each triangular prediction unit) in the CU may be inter-predicted using its uni-prediction motion vector and reference frame index. The uni-prediction motion vector and reference frame index may be derived from a uni-prediction candidate list.

Figure 6:
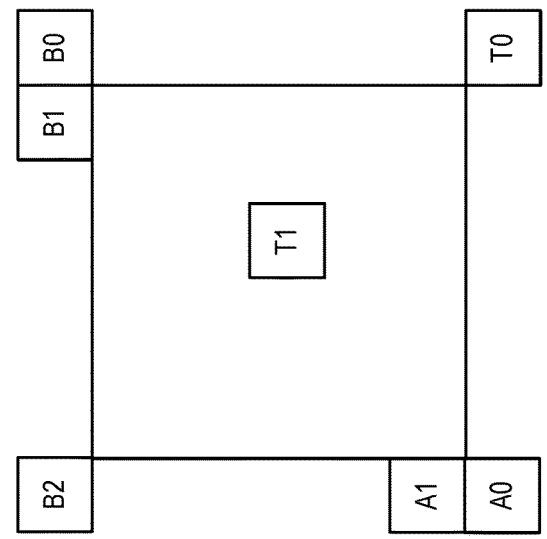
FIG. 6 illustrates an example of generating the uni-prediction motion vectors (MVs), for example, in triangle mode.

A uni-prediction candidate list may include one or more (e.g., five) uni-prediction motion vector candidates. Uni-prediction motion vector candidates may be derived from similar (e.g., the same) spatial/temporal neighboring blocks as those that are used for a merge process (e.g., the merge process of the HEVC). Uni-prediction MV candidates may be derived from five spatially neighboring blocks and two temporally collocated blocks, as illustrated in FIG. 6. Referring to FIG. 6, the motion vectors of the seven neighboring blocks may be collected and stored into the uni-prediction MV candidate list in the order of the L0 motion vector of neighboring blocks, the L1 motion vector of neighboring blocks, and the averaged motion vector of the L0 and L1 motion vectors of the neighboring blocks, for example, if the neighboring blocks are bi-predicted. If the number of MV candidates is less than five, zero (0) motion vectors may be added to the MV candidate list.

Figure 7:
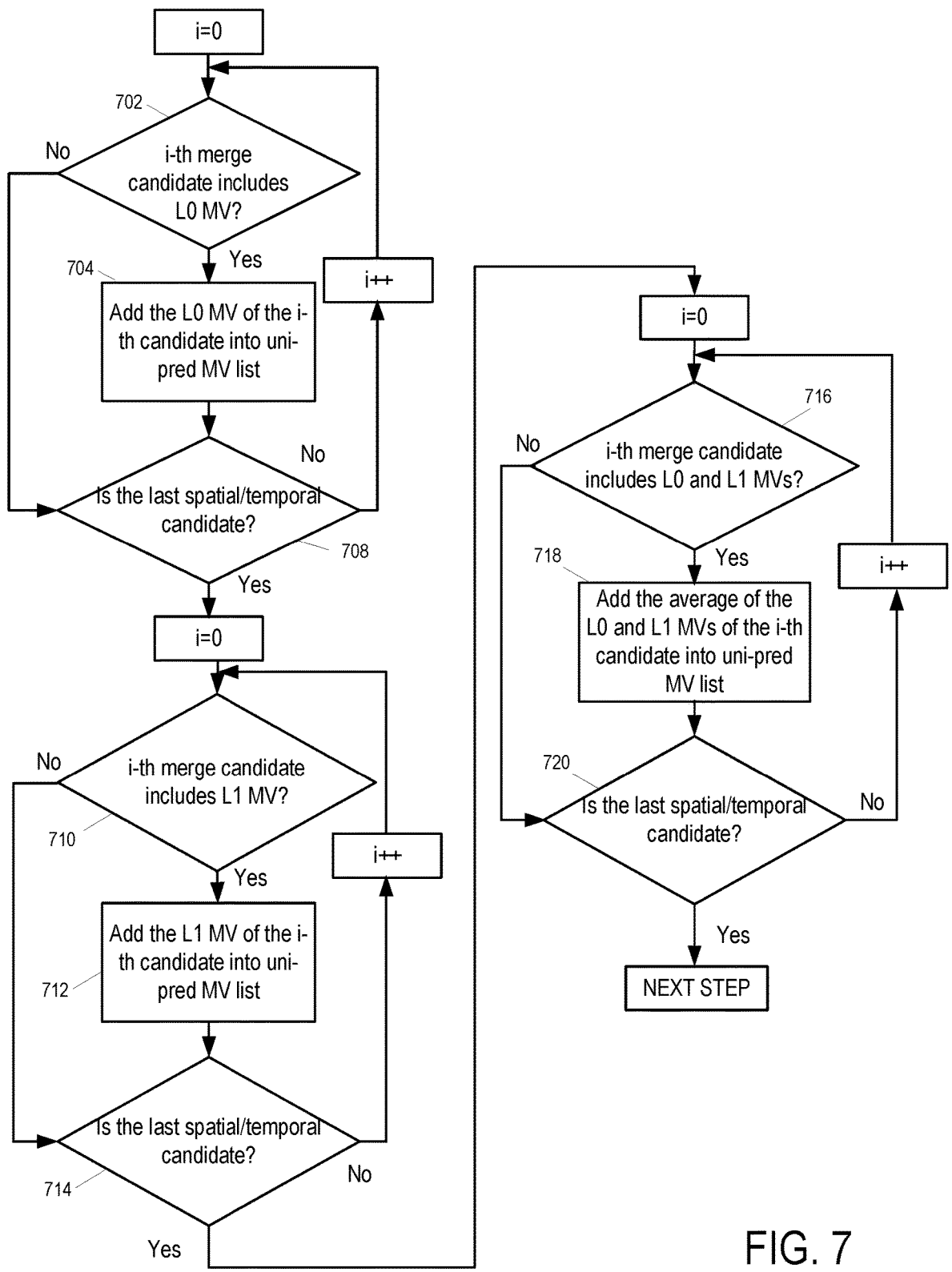
FIG. 7 illustrates an exemplary flowchart for generating a uni-predication MV list based on one or more merge candidates.

FIG. 7 illustrates a flow chart for adding the uni-prediction MVs of merge candidates into the uni-prediction MV list of a CU that is coded by triangle prediction mode. At 702, a video coding device may determine whether a merge candidate includes L0 MV. If it does, at 704, the video coding device may add the L0 MV associated with the merge candidate into a uni-prediction MV list. At 708, the video coding device may check whether the spatial/temporal candidate is the last in the list. At 710, the video coding device may determine whether a merge candidate includes L1 MV. If it does, at 712, the video coding device may add the L1 MV associated with the merge candidate into a uni-prediction MV list. At 714, the video coding device may check whether the spatial/temporal candidate is the last in the list. At 716, the video coding device may determine whether a merge candidate includes L0 and L1 MVs. If it does, at 718, the video coding device may add the average of L0 MV and L1 MV associated with the merge candidate into a uni-prediction MV list. At 720, the video coding device may check whether the spatial/temporal candidate is the last in the list.

The order of the one or more neighboring blocks (e.g., the order of how the candidate blocks may be checked and considered for addition to a candidate list) may include the one or more spatial neighboring blocks (e.g., 1 to 5) followed by one or more temporal co-located blocks (6 to 7). Referring to FIG. 6, the motion vectors of the seven neighboring blocks (e.g., A1, A0, B0, B1, B2, T0, T1) may be collected and stored into a uni-prediction candidate list according to the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

HMVP coding gain may be improved, for example, by extending the application of HMVP to other coding tools, for example, generalized bi-prediction and/or triangle inter prediction. HMVP may be employed to determine the MV correlation between the neighboring blocks. For example, HMVP may be utilized to determine the MV correlation between neighboring spatially non-adjacent blocks. Although reference is made herein to the HMVP being utilized to determine the MV correlation between neighboring blocks that are spatially non-adjacent, one skilled in the art may appreciate that the neighboring blocks may include blocks that are adjacent blocks. HMVP may be utilized to determine the MV correlation by maintaining a table of one or more MV candidates. The table may be maintained at the at an encoding device and/or a decoding device. An HMVP candidate may be defined based on motion information comprising one or more of the following: a motion vector (e.g., one or more motion vectors), a reference list (e.g., one or more reference lists), or a reference picture index (e.g., one or more reference picture indices) associated with a previously coded block In an example, a HMVP candidate may be used to derive the prediction signal of a CU with GBi disabled. In such a case, equal weights may be applied to two prediction signals associated with list 0 and list1.

In an example, HMVP and the GBi may be enabled, for example, by associating a GBi with an HMVP index. The GBi may be enabled by associating at least one GBi index with each of the HMVP entries or HMVP indexes. This may result in improvement of the coding efficiency of HMVP. GBi index may also be referred as bi-prediction weight index.

In an example, for each HMVP candidate, in addition to the motion information, the at least one GBi index may be created based on one or more of the following. When a HMVP candidate is derived from an inter CU where the GBi weight is signaled, the GBi weight of the HMVP candidate may be set to the signaled GBi weight. When a HMVP candidate is derived from a spatial merge candidate, the GBi weight of the HMVP candidate may be set to the GBi weight of the spatial candidate. When a HMVP candidate is derived from a temporal merge candidate, the GBi weight of the HMVP candidate may be set to the GBi weight of a collocated block in a temporally collocated picture. When the HMVP candidate is derived from an average merge candidate, the GBi weight of the HMVP candidate may be set to a certain fixed value (e.g., 0.5).

As described herein, pruning may be performed at one or more different stages of HMVP processing procedure. For example, pruning may be performed to remove redundant entries in an HMVP list when adding an MV candidate or an HMVP candidate to the HMVP list. In an example, pruning may be performed after determining whether an entry in the HMVP list is identical to the MV candidate or the HMVP candidate. If an identical candidate in the HMVP list is found, the identical HMVP is removed from the HMVP list. In an example, an HMVP candidate may be said to be identical to an HMVP entry in the HMVP list, if the motion information associated with the HMVP candidate is similar to the motion information associated with the HMVP entry in the HMVP list. The motion information that is compared may include one or more of: a motion vector (e.g., one or more motion vectors), a reference list (e.g., one or more reference indices), and a reference picture index (e.g., one or more reference picture indices).

In an example, in addition to the motion vector information, GBi weights may be considered in determining whether to add an HMVP candidate to a HMVP candidate list FIG. 8A illustrates an example wherein the GBi weight is considered when adding a HMVP candidate into a HMVP candidate list. As illustrated in FIG. 8A, the second entry of the HMVP list and the new HMVP candidate to be added to the HMVP list may be treated as identical when the motion information and the GBi weights of the second entry of the existing HMVP list (e.g., HMV $P_1$) are similar to the motion information and the GBi weights of the a new HMV P candidate (e.g., $C_{i-1}$). In such an example, before adding the HMVP candidate, $C_{i-1}$ to the end of the HMVP list, the matched HMVP entry in the HMVP list, $HMVP_1$ may be removed from the list and HMVP entries following HMVP entries (e.g., $HMVP_2$ to $HMVP_{i-1}$) may be moved forward as indicated by the arrows. This may be achieved, for example, by reducing the respective indices by one.

FIG. 8B illustrates an example wherein an HMVP candidate may be treated as not identical to an entry in an HMVP list. As illustrated in FIG. 8B, even though the motion information of $HMVP_1$ and $C_{i-1}$ is the same, $HMVP_1$ and $C_{i-1}$ are said to be not identical because their respective GBi weights are unequal. A FIFO process (e.g., the default FIFO process) may be applied. As illustrated in FIG. 8B, the FIFO procedure may include removing the first HMVP candidate (e.g., $HMVP_0$) from the table, moving each entry's position by one, as indicated by the arrows in FIG. 8B, to create an empty position at the end of the HMVP list, and adding the new candidate $C_{i-1}$ into the empty position at the end of the HMVP list.

HMVP candidates (e.g., which may each be associated with a GBi weight, respectively) may be used as candidates for a merge mode and/or an AMVP mode. HMVP candidates (e.g., all the HMVP candidates from the last entry to the first entry in the HMVP table) may be inserted, for example, after the TMVP candidate. When HMVP is applied to the merge mode, pruning may be applied to remove the candidates with similar (e.g., the same) motion information and similar (e.g., the same) GBi weight.

GBi indices may be used for motion-compensated prediction and HMVP pruning process. The motion-compensated prediction and HMVP pruning process may improve coding gain and increase the complexity of the pruning process. The complexity of the HMVP pruning process may increase when the motion information and the GBi weight of the HMVP candidates (e.g., each HMVP candidate in the list) are checked. In an example, the GBi weight of each of the HMVP candidates (e.g., all the HMVP candidates) may be utilized for motion-compensated prediction. A subset of the HMVP candidates may be utilized for HMVP pruning process. As described herein, an HMVP candidate may be associated with a GBi index (e.g., each HMVP candidate may be associated with one GBi index). The associated GBi weight may be utilized to generate a prediction signal of a CU (e.g., rather than determining whether two HMVP candidates are identical).

Figure 9:
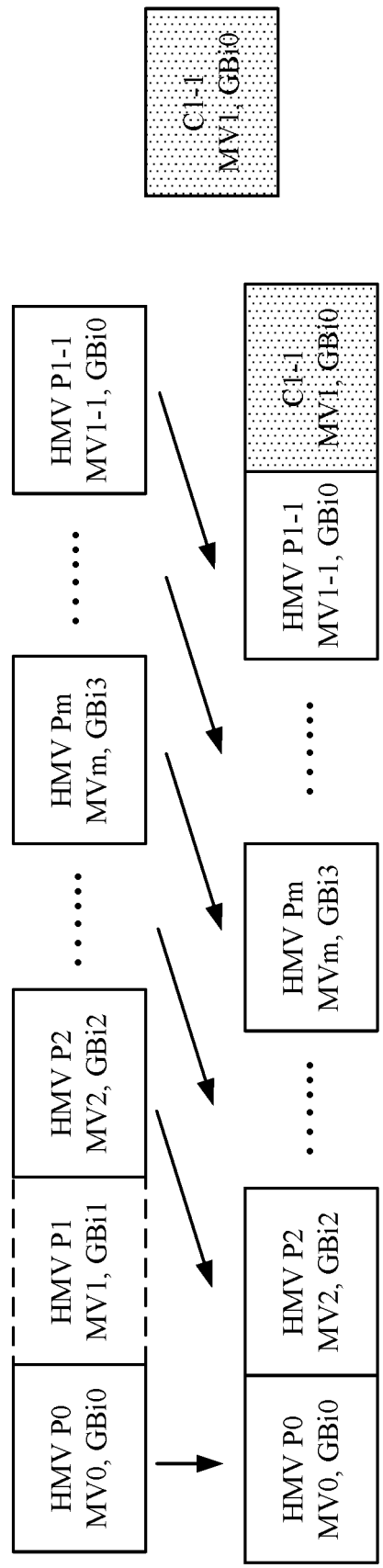
FIG. 9 illustrates an example of adding a HMVP candidate to a HMVP list.

FIG. 9 illustrates an example of adding an HMVP candidate to an HMVP list, wherein the GBi weight may not be considered when adding a HMVP candidate into a HMVP list. In the example provided in FIG. 9, the GBi index of the second entry of the existing HMVP list (e.g., $HMVP_1$) and the new HMVP candidate (e.g., $C_{i-1}$) are not the same while the motion information of the second entry of the existing HMVP list (e.g., $HMVP_1$) and the new HMVP candidate (e.g., $C_{i-1}$) are the same. In this example, if the motion information of the second entry of the existing HMVP list (e.g., $HMVP_1$) and the new HMVP candidate (e.g., $C_{i-1}$) are the same, and the GBi indices of the second entry of the existing HMVP list (e.g., $HMVP_1$) and the new HMVP candidate (e.g., $C_{i-1}$) are not the same, the second entry of the HMVP list and the new HMVP candidate may be treated as identical. As illustrated in FIG. 9, $HMVP_1$ may be removed from the HMVP candidate list, and the subsequent HMVP candidate (e.g., $HMVP_2$ to $HMVP_{i-1}$) may be moved forward, e.g., by reducing the indices by one as illustrated by arrows. $C_{i-1}$ may then be added to the end of the HMVP list.

Triangle inter prediction may be performed with the HMVP. In triangle inter prediction, the MVs in a uni-prediction candidate list may be derived from temporal and spatial neighbors. For example, the conventional spatial and temporal neighbors may be the neighbors that are used for the merge mode of the HEVC. For example, triangle inter prediction may derive the MVs in the uni-prediction candidate list from five spatial neighbors and two temporal neighbors, as illustrated in FIG. 6. In an example, MV derivation may not consider the correlation between the MVs of the blocks that are not directly spatial neighbors (e.g., non-adjacent blocks). In such a case, MV derivation may not generate accurate uni-prediction MV candidates (e.g., the most accurate uni-prediction MV candidates) to capture the true motion of the two triangle partitions. In an example, the motion information of neighboring blocks along an occlusion boundary may not be correlated (e.g., due to occluding objects that may commonly exist in content, such as nature video content). If the motion information of neighboring blocks along an occlusion boundary are not correlated, the MVs from the spatial neighbors on the occlusion boundary may not be accurate (e.g., sufficiently accurate) to act as the MV predictor of a current CU. This may lower the efficiency of inter coding. In an example, HMVP candidates (e.g., besides the existing spatial and temporal MV candidates) may be used to derive a uni-prediction MV candidate list for the triangle prediction mode, for example, to explore the correlation between the MVs of one or more neighboring blocks (e.g., spatially non-adjacent blocks).

The uni-prediction MVs of HMVP candidates may be placed at different positions of a candidate list (e.g., a final candidate list) of the uni-prediction MVs for the triangle mode. In an example, the uni-prediction MVs associated with one or more HMVP candidates may be checked and inserted in a list after spatial and/or temporal candidates. The MVs associated with an HMVP candidate may be checked (e.g., check whether the MV of a HMVP candidate is identical to an MV in the uni-prediction MV list) and inserted in the uni-prediction candidate list (e.g., after the spatial and the temporal candidates). The MVs of the candidate blocks may be collected in order of the five spatial neighbors (e.g., A1, A0, B1, B0 and B2) followed by the two temporal neighbors (e.g., T0 and T1) as illustrated in FIG. 6 and the N HMVP candidates.

The uni-prediction MVs that are used for the triangle mode may be generated as described herein. In an example, the uni-prediction MVs used for the triangle mode may be generated by adding the L0 MVs associated with one or more of the spatial/temporal and HMVP candidates. In an example, the uni-prediction MVs used for the triangle mode may be generated by adding the L1 MVs associated with one or more spatial/temporal and HMVP candidates. In an example, the uni-prediction MVs used for the triangle mode may be generated by adding average of L0 and L1 MVs of the spatial/temporal and HMVP candidates, for example, if the HMVP candidate is bi-predicted.

Figure 10:
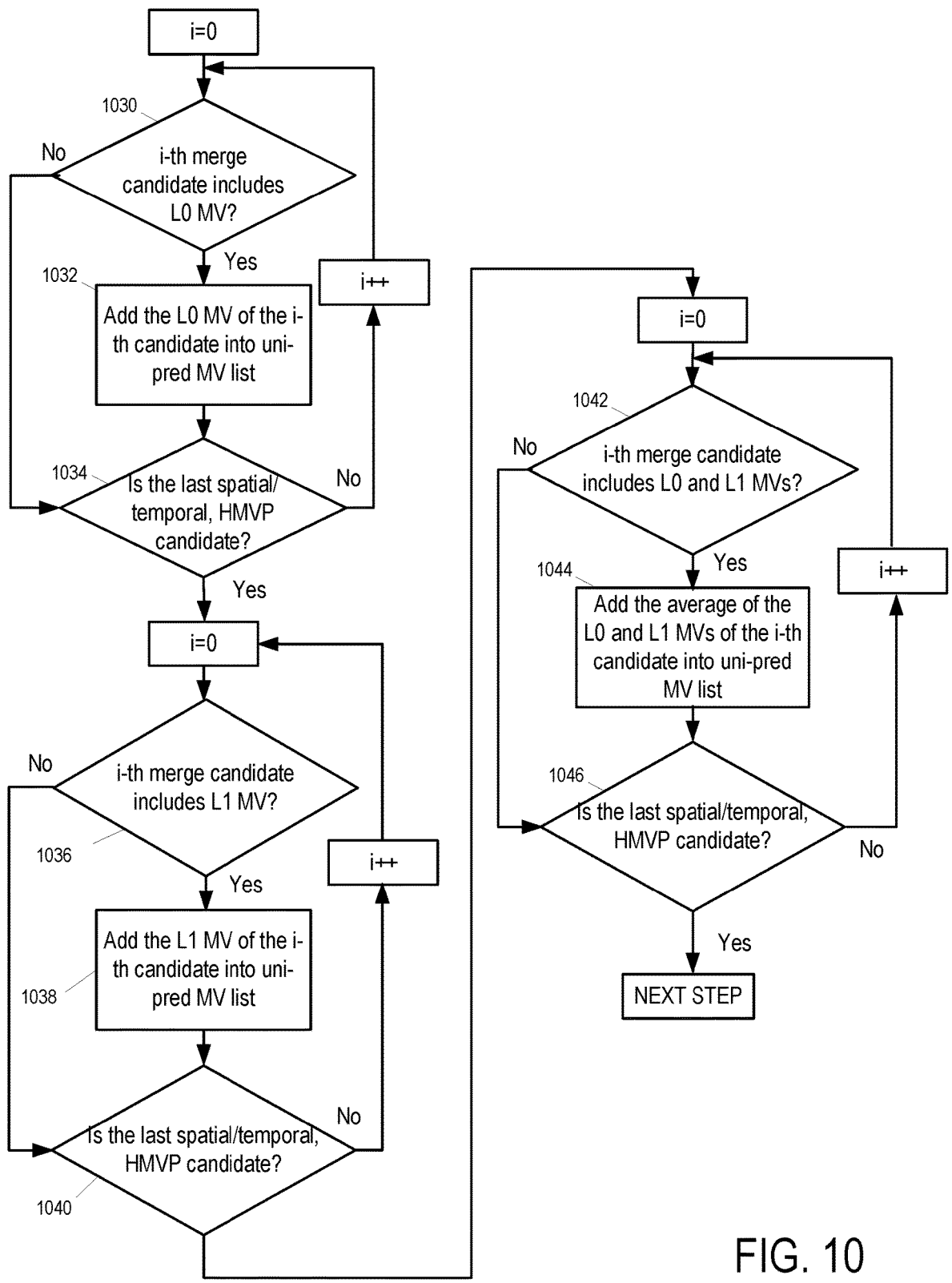
FIG. 10 illustrates an exemplary flow chart for generating a uni-prediction MV list for triangle mode based on spatial/temporal candidates and HMVP candidates.

FIG. 10 illustrates an example associated with inserting the uni-prediction MVs of merge candidates into the uni-prediction MV list of a triangle CU. As illustrated in FIG. 10, at 1030 a video coding device may determine if a candidate (e.g., an i-th merge candidate) includes an L0 MV. If yes, at 1032, the video coding device may add the L0 MV associated with the candidate to a uni-prediction MV list. At 1034, the video coding device may check whether the spatial/temporal, or the HMVP candidate is the last in the list. At 1036, the video coding device may determine whether the candidate includes an L1 MV. If yes, at 1038, the video coding device may add the L1 MV of the candidate into the uni-prediction MV list. At 1040, the video coding device may check whether the spatial/temporal, or HMVP candidate is the last in the list. At 1042, the video coding device may determine whether the candidate includes the L0 and L1 MVs. If yes, at 1044, the video coding device may add the average of L0 and L1 MVs of the candidate into the uni-prediction MV list. At 1046, the video coding device may check whether the spatial/temporal, or HMVP candidate is the last in the list.

The motion (e.g., the motion information) of spatial and temporal neighbors may be correlated with the motion (e.g., the motion information) of a current CU (e.g., more correlated than the motion of HMVP candidates). The uni-prediction MVs of the spatial and temporal candidates may be given higher priorities than the uni-prediction MVs of the HMVP candidates (e.g., to reduce the overhead of signaling candidate MVs). In examples, the uni-prediction MVs of spatial/temporal candidates may be interleaved with the uni-prediction MVs of the HMVP candidates.

A uni-prediction MV list (e.g., the final uni-prediction MV list) of a triangle CU may be generated. In an example, the uni-prediction MV list of a triangle CU may be generated by inserting the L0 MV of each spatial/temporal candidate in the uni-prediction MV list. In an example, the uni-prediction MV list of a triangle CU may be generated by inserting the L1 MV of each spatial/temporal candidate in the uni-prediction MV list. In an example, the uni-prediction MV list of a triangle CU may be generated by inserting the L0 MV of each HMVP candidate in the uni-prediction MV list. In an example, the uni-prediction MV list of a triangle CU may be generated by inserting the L1 MV of each HMVP candidate in the uni-prediction MV list.

In an example, the uni-prediction MV list of a triangle CU may be generated by inserting the average of L0 and L1 MV of the spatial/temporal candidate (e.g., each spatial/temporal candidate, if the candidate is bi-predicted) in the uni-prediction MV list. In an example, the uni-prediction MV list of a triangle CU may be generated by inserting the average of L0 and L1 MVs of the HMVP candidate (e.g., each HMVP candidate, if the candidate is bi-predicted) in the uni-prediction MV list.

Figure 11:
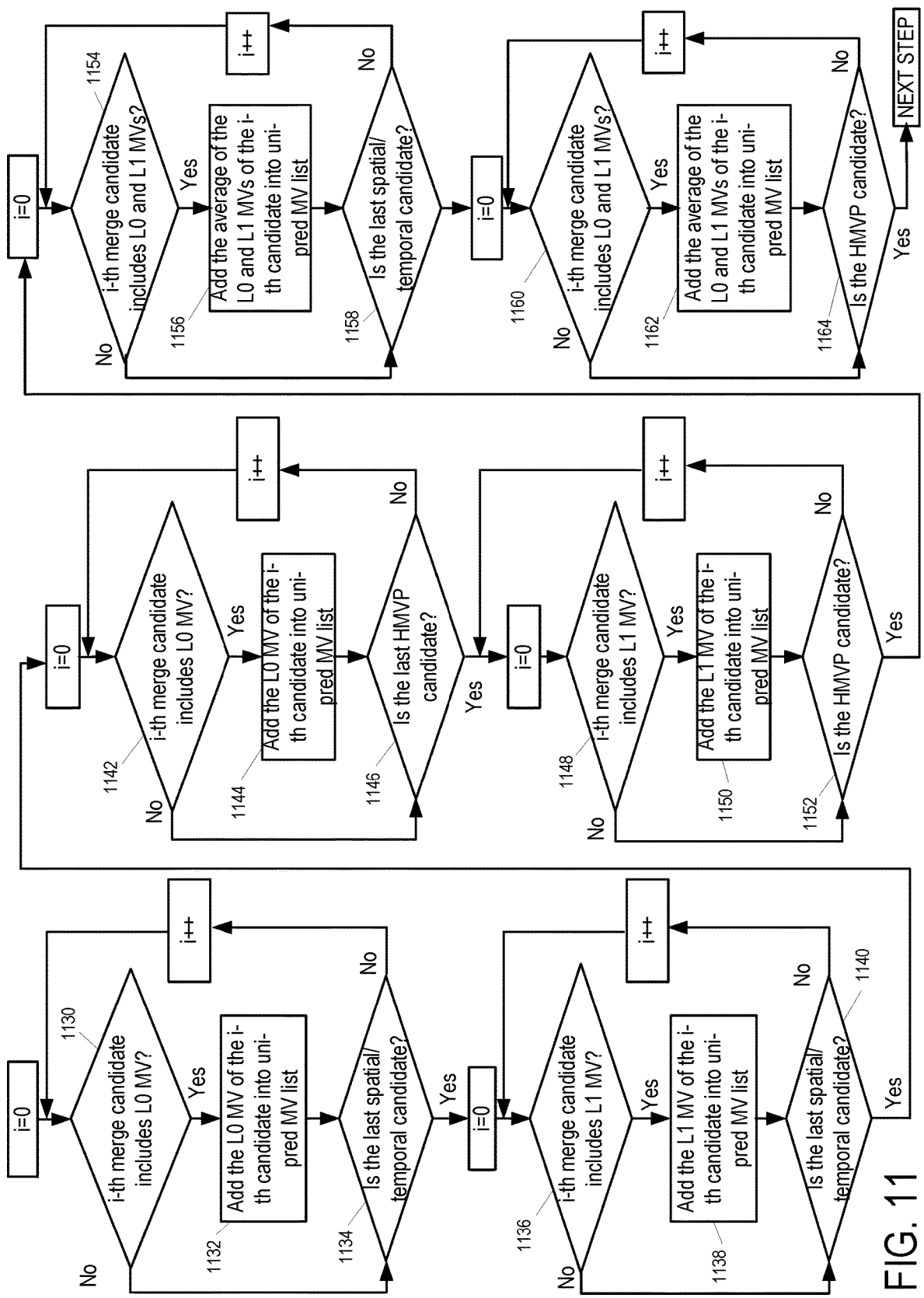
FIG. 11 illustrates an exemplary flow chart for generating a uni-prediction MV list for triangle mode based on interleaving the uni-prediction MVs of spatial/temporal candidates and HMVP candidates.

FIG. 11 illustrates an example of generating the uni-prediction MV list of triangle mode when the uni-prediction MVs of spatial/temporal candidates and the HMVP candidates are interleaved. As illustrated in FIG. 11, at 1130 a video coding device may determine if a candidate (e.g., an i-th merge candidate) includes an L0 MV. If yes, at 1132, the video coding device adds the L0 MV associated with the candidate to a uni-prediction MV list. At 1134, the video coding device may check whether the spatial/temporal candidate is the last in the list. At 1136 the video coding device may determine if a candidate includes an L1 MV. If yes, at 1138, the video coding device may add the L1 MV associated with the candidate to a uni-prediction MV list. At 1140, the video coding device may check whether the spatial/temporal candidate is the last in the list. At 1142 the video coding device may determine if a candidate includes an L0 MV. If yes, at 1144, the video coding device may add the L1 MV associated with the candidate to a uni-prediction MV list. At 1146, the video coding device may check whether the HMVP candidate is the last in the list. At 1148 the video coding device may determine if a candidate includes an L1 MV. If yes, at 1150, the video coding device may add the L1 MV associated with the candidate to a uni-prediction MV list. At 1152, the video coding device may check whether the HMVP candidate is the last in the list. At 1154 the video coding device may determine if a candidate includes L0 and L1 MVs. If yes, at 1156, the video coding device may add the average of the L0 and L1 MVs associated with the candidate to a uni-prediction MV list. At 1158, the video coding device may check whether the spatial/temporal candidate is the last in the list. At 1160 the video coding device may determine if a candidate includes L0 and L1 MVs. If yes, at 1162, the video coding device may add the average of the L0 and L1 MVs associated with the candidate to a uni-prediction MV list. At 1164, the video coding device may check whether the HMVP candidate is the last in the list.

Figure 12A:
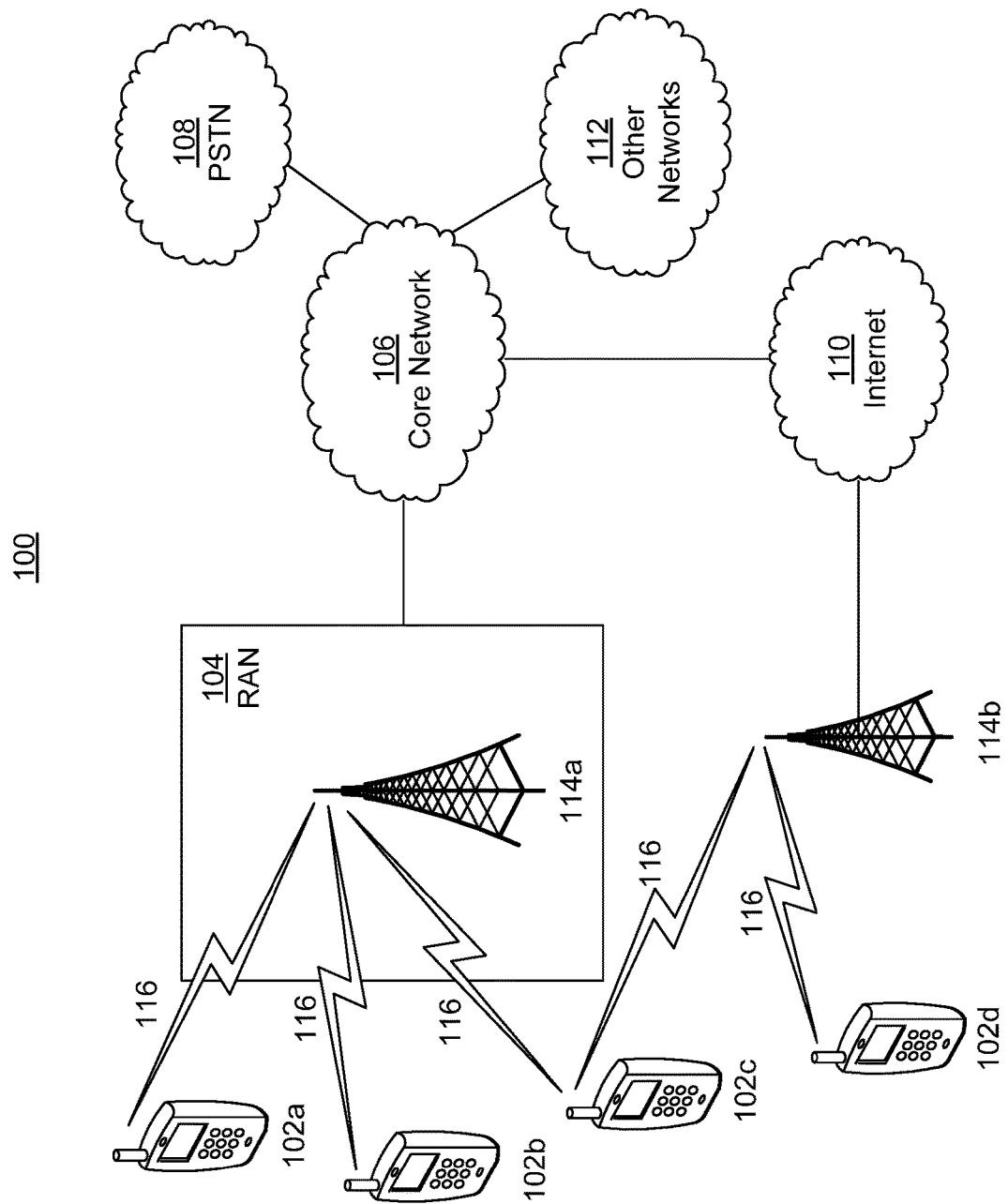
FIG. 12A is a system diagram of an example communications system in which one or more disclosed embodiments may be implemented.

FIG. 12A is a diagram illustrating an example communications system 100 in which one or more disclosed embodiments may be implemented. For example, one or more of the features associated with the video coding device as described herein may be included in one or more of the WTRUs 102a, 102b, 102c and 102d of the communications system 100. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 12A, the communications system 100 may include wireless transmit/receive units (WTRUs) 102a, 102b. 102c. 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b. 102c. 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 12A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c. 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 12A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 12A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 12A may be configured to communicate with the base station 114a, which may employ a cellular-based radio technology, and with the base station 114b, which may employ an IEEE 802 radio technology.

Figure 12B:
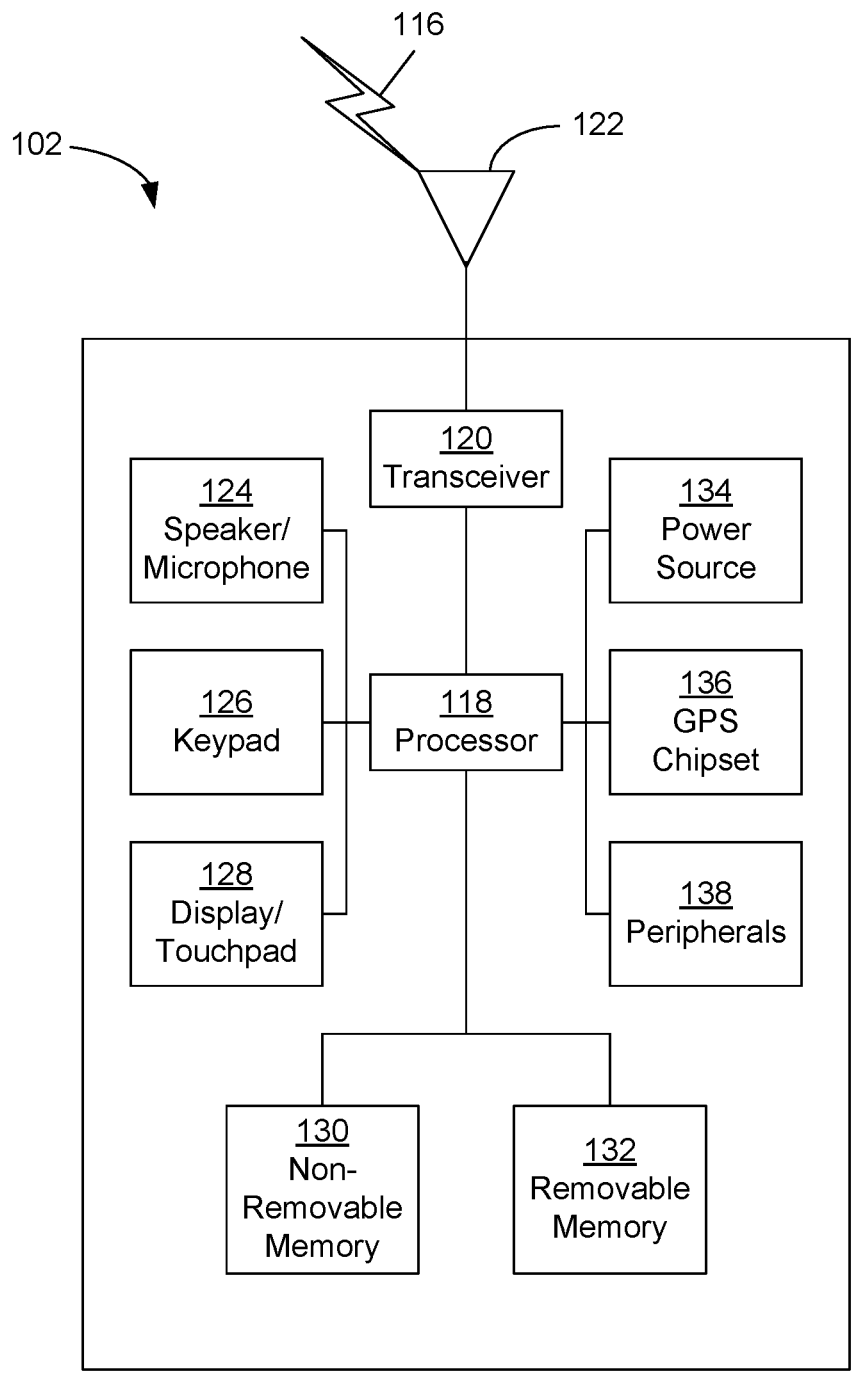
FIG. 12B is a system diagram of an example wireless transmit/receive unit (WTRU) that may be used within the communications system illustrated in FIG. 12A.

FIG. 12B is a system diagram illustrating an example WTRU 102. As shown in FIG. 12B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 12B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (R/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 12C:
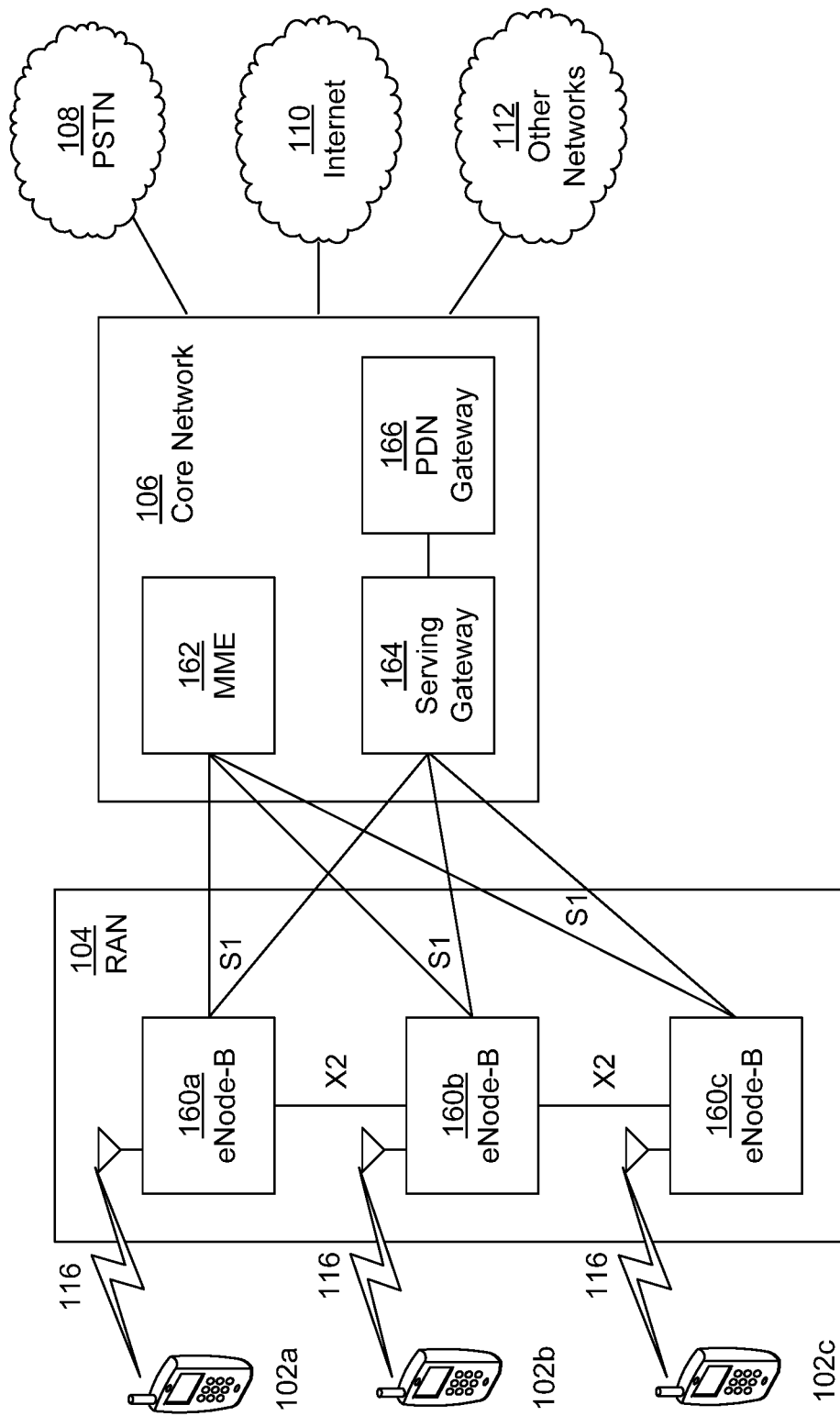
FIG. 12C is a system diagram of an example radio access network (RAN) and an example core network (CN) that may be used within the communications system illustrated in FIG. 12A.

FIG. 12C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 12C, the eNode-Bs 160*a*, 160*b*, 160*c* may communicate with one another over an X2 interface.

The CN 106 shown in FIG. 12C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*. 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers Although the WTRU is described in FIGS. 12A-12D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e LS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an 'ad-hoc' mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 12D:
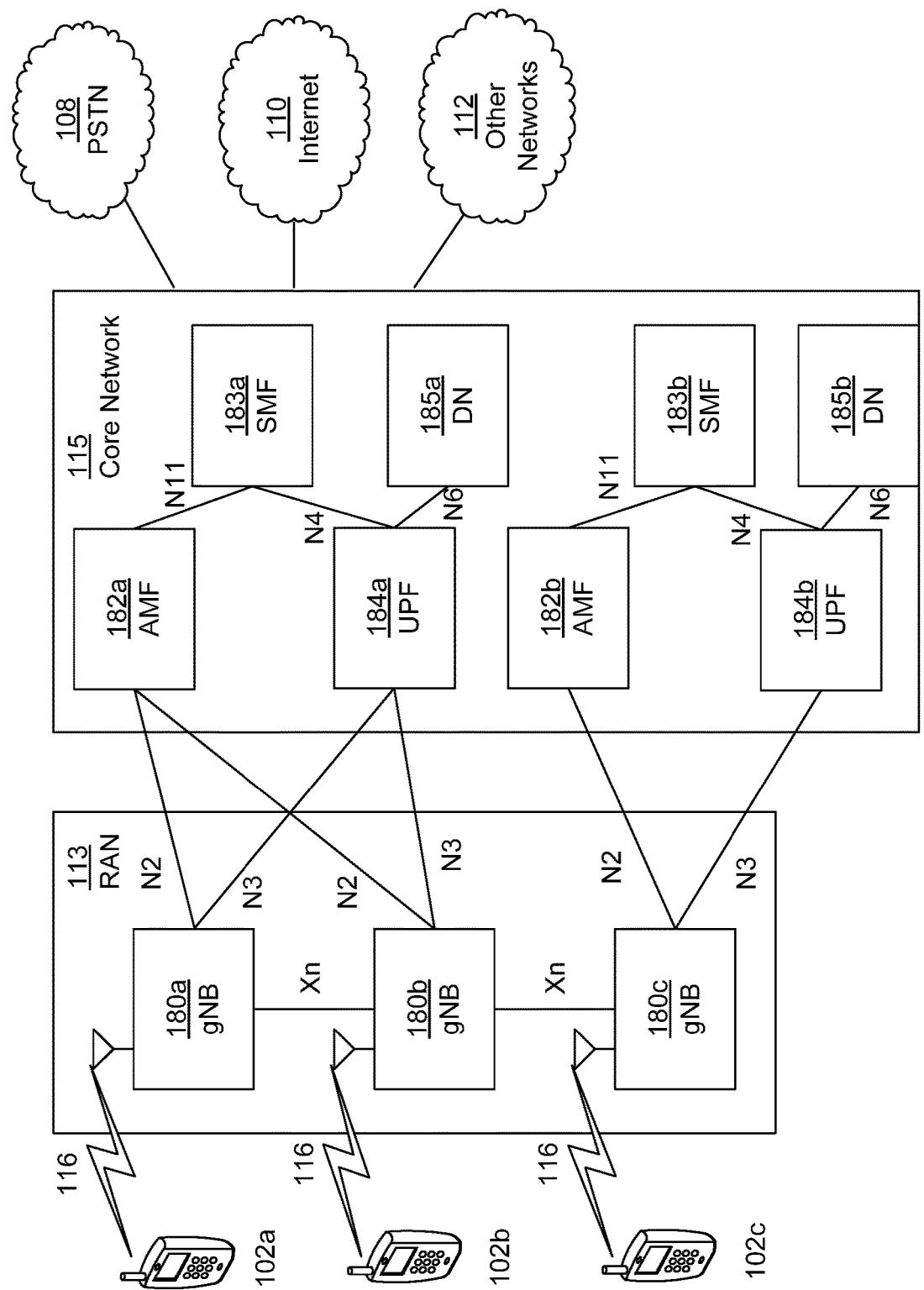
FIG. 12D is a system diagram of further example RAN and a further example CN that may be used within the communications system illustrated in FIG. 12A.

FIG. 12D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 12D, the gNBs 180a, 180b, 180c may communicate with one another over an Xn interface.

The CN 115 shown in FIG. 12D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 12A-12D, and the corresponding description of FIG. 12A-12D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes and techniques described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A device for video decoding, the device comprising:
   a processor configured to:
      generate a candidate list for performing motion compensated prediction associated with a current block, wherein the current block is partitioned into a triangular first partition and a second partition;
      add at least one of a spatial candidate or a temporal candidate to the candidate list;
      derive a history-based motion vector prediction (HMVP) candidate from a previously coded block;
      add the HMVP candidate to the candidate list; and
      decode the current block that comprises the triangular first partition and the second partition based on the candidate list.

2. The device of claim 1, wherein the HMVP candidate is added to the candidate list after at least one of the spatial candidate or the temporal candidate.

3. The device of claim 1, wherein the processor is further configured to:
   interleave the HMVP candidate and at least one of the spatial candidate or the temporal candidate.

4. The device of claim 1, wherein the processor is further configured to:
   identify a first candidate from the candidate list and a second candidate from the candidate list, wherein:
      the first candidate is associated with the triangular first partition and the second candidate is associated with the second partition, and
      the current block is decoded based on the first candidate being associated with the triangular first partition and the second candidate being associated with the second partition.

5. The device of claim 1, wherein the processor is further configured to:
   identify a first candidate from the candidate list and a second candidate from the candidate list, wherein:
      the first candidate is the HMVP candidate associated with the triangular first partition and the second candidate is the spatial candidate or the temporal candidate associated with the second partition, and
      the current block is decoded based on the HMVP candidate being associated with the triangular first partition and the spatial candidate or the temporal candidate being associated with the second partition.

6. The device of claim 1, wherein the processor is further configured to:

identify a merge index associated with the triangular first partition and the second partition; and
identify a first candidate from the candidate list and a second candidate from the candidate list based on the merge index, wherein:
the HMVP candidate is added to the candidate list after at least one of the spatial candidate or the temporal candidate,
the first candidate is the HMVP candidate associated with the triangular first partition and the second candidate is the spatial candidate or the temporal candidate associated with the second partition, and
the current block is decoded based on the HMVP candidate being associated with the triangular first partition and the spatial candidate or the temporal candidate being associated with the second partition.

7. The device of claim 1, wherein the HMVP candidate comprises motion information and a reference index.

8. The device of claim 1, wherein the second partition is partitioned at an angle and has different dimensions than the triangular first partition.

9. The device of claim 1, wherein the candidate list is a uni-prediction motion vector candidate list.

10. The device of claim 1, wherein the candidate list is a uni-prediction motion vector candidate list, the spatial candidate is a first spatial candidate, the temporal candidate is a first temporal candidate, the HMVP candidate is a first HMVP candidate, and the processor is further configured to:
determine at least one of the first spatial candidate or the first temporal candidate and the first HMVP candidate are associated with a first set of motion vectors;
determine at least one of a second spatial candidate or a second temporal candidate and a second HMVP candidate are associated with a second set of motion vectors;
add at least one of the first spatial candidate or the first temporal candidate to the uni-prediction motion vector candidate list;
add the first HMVP candidate to the uni-prediction motion vector candidate list;
add at least one of the second spatial candidate or the second temporal candidate to the uni-prediction motion vector candidate list; and
add the second HMVP candidate to the uni-prediction motion vector candidate list.

11. A method for video decoding, the method comprising:
generating a candidate list for performing motion compensated prediction associated with a current block, wherein the current block is partitioned into a triangular first partition and a second partition;
adding at least one of a spatial candidate or a temporal candidate to the candidate list;
deriving a history-based motion vector prediction (HMVP) candidate from a previously coded block;
adding the HMVP candidate to the candidate list; and
decoding the current block that comprises the triangular first partition and the second partition based on the candidate list.

12. The method of claim 11, wherein the HMVP candidate is added to the candidate list after at least one of the spatial candidate or the temporal candidate.

13. The method of claim 11, further comprising:
interleaving the HMVP candidate and at least one of the spatial candidate or the temporal candidate.

14. The method of claim 11, further comprising:
identifying a first candidate from the candidate list and a second candidate from the candidate list, wherein:
the first candidate is associated with the triangular first partition and the second candidate is associated with the second partition, and
the current block is decoded based on the first candidate being associated with the triangular first partition and the second candidate being associated with the second partition.

15. The method of claim 11, further comprising:
identifying a first candidate from the candidate list and a second candidate from the candidate list, wherein:
the first candidate is the HMVP candidate associated with the triangular first partition and the second candidate is the spatial candidate or the temporal candidate associated with the second partition, and
the current block is decoded based on the HMVP candidate being associated with the triangular first partition and the spatial candidate or the temporal candidate being associated with the second partition.

16. The method of claim 11, further comprising:
identifying a merge index associated with the triangular first partition and the second partition; and
identifying a first candidate from the candidate list and a second candidate from the candidate list based on the merge index, wherein:
the HMVP candidate is added to the candidate list after at least one of the spatial candidate or the temporal candidate,
the first candidate is the HMVP candidate associated with the triangular first partition and the second candidate is the spatial candidate or the temporal candidate associated with the second partition, and
the current block is decoded based on the HMVP candidate being associated with the triangular first partition and the spatial candidate or the temporal candidate being associated with the second partition.

17. The method of claim 11, wherein the HMVP candidate comprises motion information and a reference index.

18. The method of claim 11, wherein the second partition is partitioned at an angle and has different dimensions than the triangular first partition.

19. The method of claim 11, wherein the candidate list is a uni-prediction motion vector candidate list.

20. A device for video encoding, the device comprising:
a processor configured to:
generate a candidate list for performing motion compensated prediction associated with a current block, wherein the current block is partitioned into a triangular first partition and a second partition;
add at least one of a spatial candidate or a temporal candidate to the candidate list;
derive a history-based motion vector prediction (HMVP) candidate from a previously coded block;
add the HMVP candidate to the candidate list; and
encode the current block that comprises the triangular first partition and the second partition based on the candidate list.

21. The device of claim 20, wherein the processor is further configured to:
identify a first candidate from the candidate list and a second candidate from the candidate list, wherein:
the first candidate is associated with the triangular first partition and the second candidate is associated with the second partition, and
the current block is encoded based on the first candidate being associated with the triangular first partition and the second candidate being associated with the second partition.

22. The device of claim 20, wherein the processor is further configured to:
identify a first candidate from the candidate list and a second candidate from the candidate list, wherein:
the first candidate is the HMVP candidate associated with the triangular first partition and the second candidate is the spatial candidate or the temporal candidate associated with the second partition, and
the current block is encoded based on the HMVP candidate being associated with the triangular first partition and the spatial candidate or the temporal candidate being associated with the second partition.

23. The device of claim 20, wherein the processor is further configured to:
identify a merge index associated with the triangular first partition and the second partition; and
identify a first candidate from the candidate list and a second candidate from the candidate list based on the merge index, wherein:
the HMVP candidate is added to the candidate list after at least one of the spatial candidate or the temporal candidate,
the first candidate is the HMVP candidate associated with the triangular first partition and the second candidate is the spatial candidate or the temporal candidate associated with the second partition, and
the current block is encoded based on the HMVP candidate being associated with the triangular first partition and the spatial candidate or the temporal candidate being associated with the second partition.

24. A method for video encoding, the method comprising:
generating a candidate list for performing motion compensated prediction associated with a current block, wherein the current block is partitioned into a triangular first partition and a second partition;
adding at least one of a spatial candidate or a temporal candidate to the candidate list;
deriving a history-based motion vector prediction (HMVP) candidate from a previously coded block;
adding the HMVP candidate to the candidate list; and
encoding the current block that comprises the triangular first partition and the second partition based on the candidate list.

25. The method of claim 24, further comprising:
identifying a first candidate from the candidate list and a second candidate from the candidate list, wherein:
the first candidate is associated with the triangular first partition and the second candidate is associated with the second partition, and
the current block is encoded based on the first candidate being associated with the triangular first partition and the second candidate being associated with the second partition.

26. The method of claim 24, further comprising:
identifying a first candidate from the candidate list and a second candidate from the candidate list, wherein:
the first candidate is the HMVP candidate associated with the triangular first partition and the second candidate is the spatial candidate or the temporal candidate associated with the second partition, and
the current block is encoded based on the HMVP candidate being associated with the triangular first partition and the spatial candidate or the temporal candidate being associated with the second partition.

27. The method of claim 24, further comprising:
identifying a merge index associated with the triangular first partition and the second partition; and
identifying a first candidate from the candidate list and a second candidate from the candidate list based on the merge index, wherein:
the HMVP candidate is added to the candidate list after at least one of the spatial candidate or the temporal candidate,
the first candidate is the HMVP candidate associated with the triangular first partition and the second candidate is the spatial candidate or the temporal candidate associated with the second partition, and
the current block is encoded based on the HMVP candidate being associated with the triangular first partition and the spatial candidate or the temporal candidate being associated with the second partition.

\* \* \* \* \*